June 13, 1961 P. MALLERY 2,988,733
MAGNETIC MEMORY ARRANGEMENT
Filed Dec. 29, 1958
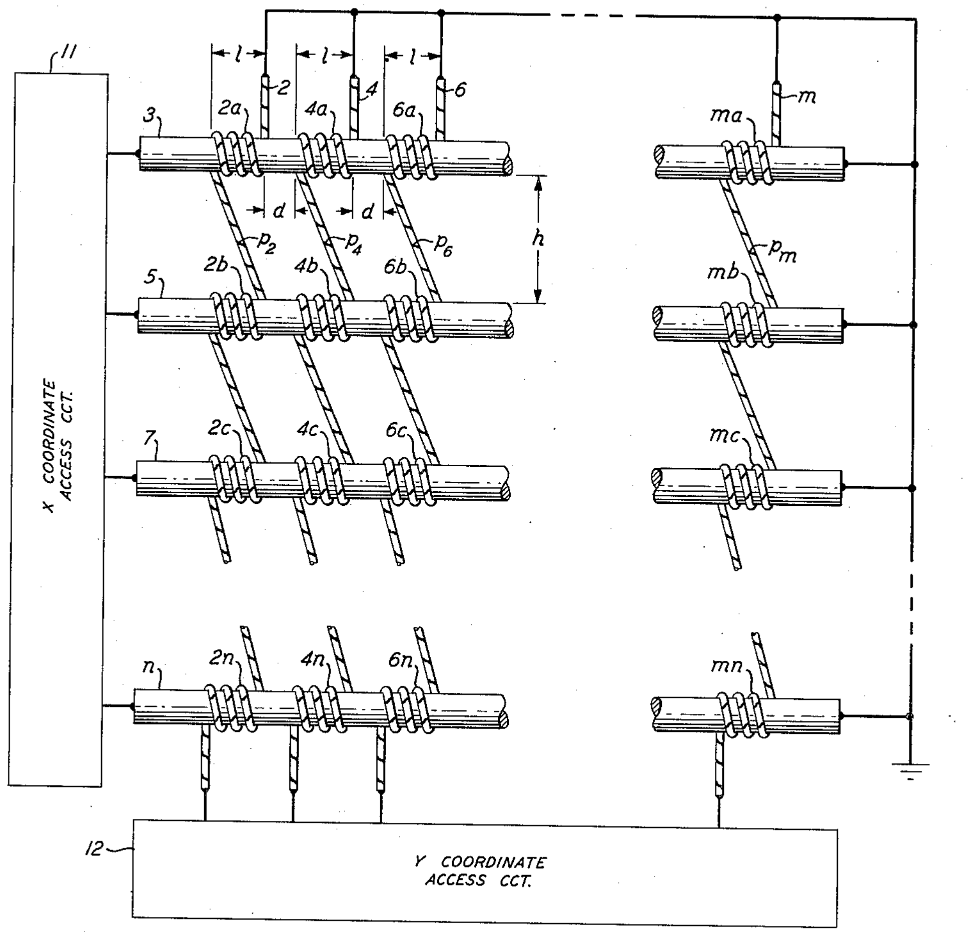
INVENTOR
P. MALLERY
BY Kenneth B Hamlin
ATTORNEY 2,988,733

MAGNETIC MEMORY ARRANGEMENT

Paul Mallery, Murray Hill, N.J., assignor to Bell Telephone Laboratories, Incorporated, New York, N.Y., a corporation of New York Filed Dec. 29, 1958, Ser. No. 783,467
7 Claims. (Cl. 340—174)

This invention relates to magnetic memory devices and more particularly to an improved information storage element.

In the copending application of A. H. Bobeck, Serial No. 675,522, filed August 1, 1957, there is disclosed a novel magnetic memory element for storing binary information in a preferred magnetic flux path associated with an electrical conductor. More particularly, it is therein demonstrated that coincident current techniques may be utilized to insert information into a preferred helical flux path established in a magnetic conductor. The embodiments therein described illustrate several methods by which a preferred helical flux path may be established, viz., by producing a quiescent torsional stress anisotropy in an elongated, unannealed conductor which stress, in the case of a nickel conductor, causes the preferred path of magnetization to lie within the conductor along the path of greatest compression, e.g., at a pitch angle of substantially 45°; by annealing an elongated conductor in a helical magnetic field; by threading or grooving the surface of an elongated conductor to form a thread thereon which thread establishes a boundary constraint upon the flux forcing it to follow the direction of the helical groove; and by helically winding a magnetic wire about an elongated non-magnetic conductor, in which case the pitch of the helical magnetization field is identical to the pitch of the magnetic wire.

In each of the above-mentioned embodiments, information is stored by establishing a set region of magnetization within the preferred flux path using so-called coincident current techniques. Thus, in the first three of the above-mentioned cases one of the coincident currents is applied to the magnetic conductor and the other of the coincident currents is applied to a coaxial solenoid positioned on the magnetic conductor. In the fourth of the above-mentioned cases one of the coincident currents is applied to the non-magnetic conductor upon which the magnetic wire is helically wound and the other of the coincident currents is applied to a coaxial solenoid mounted over the assembly consisting of the non-magnetic conductor and the magnetic wire helically wound upon the non-magnetic conductor. In each of these embodiments the minimum linear space required to register a bit is determined by the minimum length of magnetic material within which a stable magnetic spot can be established. This minimum bit-length is a determining factor in the physical size of a memory array and is a function of the materials used and the geometry of their arrangement. In the above embodiments inasmuch as the information bits which are registered along an elongated member are all on a common magnetic member, linear space must be left between adjacently registered bits to allow for the end-effects or flux interaction regions between the registered bits. Thus, the linear requirement for minimum stable bit length and the linear requirement for between-bit spacing are cumulative and establish a minimum physical size for the information storage assembly.

In addition to the already noted techniques for fabricating magnetic memory elements, the above-mentioned application discloses a magnetic memory array wherein the solenoid coil may be replaced by an orthogonal copper conductor in which case a magnetic matrix may be constructed in the form of a wire mesh or screen.

The spacing between copper conductors measured along each of the magnetic memory elements must here again be sufficiently large to allow for the interaction regions between the bits registered in the magnetic memory element under each of the copper conductors. While in many applications this structure possesses adequate mechanical rigidity, the necessity to leave additional linear space between rows of copper conductors and the desirability of providing additional mechanical stability leaves room for certain improvements to be made. Where such an array is fabricated of magnetic memory elements of the first-mentioned type the maintenance and stabilization of the preferred helical flux path against mechanical disturbance presents an additional problem.

Accordingly, it is an object of the present invention to provide an improved information storage element.

It is another object of the present invention to facilitate the compact storage of binary information.

It is another object of the present invention to provide a mechanically stable information storage array.

In accordance with the principles of this invention a magnetically retentive conductor having a preferred helical magnetization path established therein is wound about an elongated non-magnetic conductor to define in the region common to both conductors an information storage element. In one specific illustrative embodiment, an information storage array comprises a plurality of closely spaced coils of helical flux path wire arranged along the non-magnetic conductors, the linear spacing between the coils advantageously not being limited by the length of interaction region normally required to be provided between the non-magnetic solenoid windings in prior art information storage elements of the class described above. It is an aspect of this particular embodiment that the minimum magnetic conductor length required to define a stable magnetized region be developed along the thread of a coiled-up helical flux path magnetic conductor.

Accordingly, it is a feature of the present invention that an electrical conductor having a preferred magnetic flux path in association therewith be wound about a non-magnetic conductor to define a magnetic storeg element in the region common to both conductors.

It is another feature of the present invention that an electrical conductor having established therein a preferred helical magnetic flux path be coiled about a non-magnetic conductive mandrel thereby to define a binary information storage device.

It is another feature of the present invention in one aspect thereof that magnetic information bits be arranged along an elongated non-magnetic conductor, each of the bits occupying less than a critical magnetic length in the direction of the conductor.

It is another feature of the present invention that a magnetic conductor having a quiescent torsional strain anisotropy defining therein a preferred helical flux path be coiled about a non-magnetic conductive mandrel in a direction to mechanically stabilize said strain anisotropy.

A complete understanding of this invention and of these and various other features thereof may be gained from the following detailed description and the accompanying drawing, the single figure of which shows an information-storage array, or matrix of the coincident current type. In the figure there is shown a plurality of elongated, non-magnetic conductor elements 3, 5, 7 . . . *n* which together with the X-coordinate access circuit 11 comprise the means for applying one of a pair of coincident currents to the array. The other of the pair of coincident currents is applied to the array via Y-coordinate access circuit 12 and magnetic conductors 2, 4, 6 . . . *m* having helical flux paths *p*2, *p*4, *p*6 . . . *pn* associated therewith which magnetic conductors are, advantageously, any of the type mentioned above and disclosed in the copending application of A. H. BoBeck, Serial No. 675,522. In addition, either the X or Y coordinate access circuit 11 or 12 also comprises means for applying a current of opposite polarity for readout of the magnetic state set by coincident current energization correspondingly, either the Y or X coordinate access circuit 12 or 11 respectively, comprises an information utilization circuit responsive to the voltage generated, respectively in the magnetic conductor 2, 4, 6 . . . *m* or in the non-magnetic conductor elements 3, 5, 7 . . . *n*. Such access circuits are described in the above noted application of A. H. Bobeck. Each of the helical flux path magnetic conductors 2, 4, 6 . . . *m* is coiled about each of the non-magnetic conductors 3, 5, 7 . . . *n*, thus there are positioned on non-magnetic conductor 3, for example, the coils 2*a*, 4*a*, 6*a* . . . *ma* and similarly on non-magnetic conductor *n* there are positioned the successive coils 2*n*, 4*n*, 6*n* . . . *mn*.

In operation, an information bit may be set in any of the coils 2*a* to *ma* by simultaneously energizing non-magnetic conductor 3 and one or more of helical flux path conductors 2, 4, 6 . . . *m*. Each of the coils 2*a*, 4*a*, 6*a* . . . *ma* may advantageously be reduced to the minimum length *l*, which length measured along the axis of the non-magnetic conductor 3 is less than the length of magnetic conductor 2 measured along the thread of any of the coils 2*a* . . . *ma*. This is because the minimum required bit-length is developed within the turns of each of the coils 2*a* . . . *ma* rather than along the linear dimension of conductor 3. Thus the linear space required along each of the non-magnetic conductors 3 to *n* for the registration of each binary bit may be made smaller than the minimum critical length required for the registration of the magnetic spot in the helical flux paths *p*2—*pm*. In addition, the helical flux path established in the magnetic conductor is advantageously stabilized against mechanical disturbances. Thus for example, winding the magnetic conductor about the non-magnetic conductor in a left-hand pitch will tend to tighten a right-hand pitch of a torsional stress in the magnetic conductor. On the other hand, the winding of the magnetic conductor about the non-conductor in a right-hand pitch will tend to loosen a right-hand pitch of a torsional stress in the magnetic conductor. Therefore the initial pitch of the torsional stress in the magnetic conductor may advantageously be modified by the direction of the winding of the magnetic conductor about the non-magnetic conductor with the winding stabilizing or locking the torsional stress in place.

The distance *d* in the drawing similarly may be made very small inasmuch as adjacent information bits may be registered along an elongated conductor without the need of any magnetic member therebetween as was the case in the prior art. On the other hand, the distance *h* shown between each of the non-magnetic conductors 3 to *n* may be made very small even though there exists a ferromagnetic path therebetween inasmuch as the minimum critical bit lengths as well as the length required to be left for end-effects between adjacently registered bits are both devloped along the thread of each of the coils 2*a*, 2*b*, 2*c* . . . 2*n* through *ma*, *mb*, *mc* . . . *mn* rather than along a linear dimension of any of the conductors 2, 4, 6 . . . *m*.

It is to be understood that the above-described arrangements are illustrative of the application of the principles of the present invention. Numerous other arrangements may be devised by those skilled in the art without departing from the scope of the invention.

What is claimed is:

1. A memory element comprising an elongated non-magnetic conductor, a magnetic conductor having bistable state remanence characteristics in a preferred helical flux path, said magnetic conductor being helically wound about said non-magnetic conductor, and means for selectively energizing said conductors to determine said state.

2. A memory element in accordance with claim 1 wherein said last-mentioned means comprises means for applying currents to said conductors.

3. A memory element in accordance with claim 2 wherein said helical flux path is established in said magnetic conductor by a torsional strain anisotropy.

4. A memory element in accordance with claim 3 wherein said magnetic conductor is helically wound about said non-magnetic conductor in a direction to aid said torsional strain anisotropy.

5. An information storage array comprising at least a first and a second elongated, non-magnetic, electrically conductive member, a magnetically retentive conductor having a preferred helical flux path established therein, said conductor being coupled to said first and to said second member respectively by first and second turns of said conductor about each said member, and means for selectively energizing said member and said conductor to determine the retentive magnetic flux in said turns.

6. An information storage array in accordance with claim 5 wherein said helical flux path is established in said conductor by a torsional strain anisotropy and wherein said first and said second turns are in a direction to mechanically stabilize said strain anisotropy.

7. A device for registering information according to the remanent states exhibited by a magnetic region of at least a minimal length, said device comprising an elongated nonmagnetic conductor, and a magnetic member having a preferred helical flux path exhibiting said states, said member being further helically entwined along at least a first, axial, less-than-said-minimal-length of said conductor, each said axial length defining at least a said minimal length of said path.

References Cited in the file of this patent

"Nondestructive Sensing of Magnetic Cores," by Buck and Frank, from Communications and Electronics, pp. 822–830, June 1954.

"Thin Films, Memory Elements" from Electrical Manufacturing, vol. 61, No. 1, January 1958, pp, 95–98.